J. W. EVANS.
BOLL WEEVIL EXTERMINATOR.
APPLICATION FILED MAY 15, 1908.

931,401.

Patented Aug. 17, 1909.

WITNESSES:

INVENTOR
James W. Evans,
BY
ATTORNEY

UNITED STATES PATENT OFFICE.

JAMES W. EVANS, OF PURDON, TEXAS, ASSIGNOR OF ONE-HALF TO JESSIE B. BANKS, OF BARRY, TEXAS.

BOLL-WEEVIL EXTERMINATOR.

No. 931,401.  Specification of Letters Patent.  Patented Aug. 17, 1909.

Application filed May 15, 1908. Serial No. 432,981.

*To all whom it may concern:*

Be it known that I, JAMES W. EVANS, a citizen of the United States, residing at Purdon, in the county of Navarro and State of Texas, have invented certain new and useful Improvements in Boll-Weevil Exterminators, of which the following is a specification.

My invention relates to new and useful improvements in boll weevil machines.

The object of the invention is to provide a machine comprising means for gently brushing the boll weevils and dead squares from the stalks to the ground.

A further object is to gather the weevils and squares which have been brushed to the ground and bring them into the path of means for crushing them.

Finally the object of the invention is to provide a device of the character described that will be strong, durable, efficient and simple and comparatively inexpensive to construct, and also one in which the parts will not be liable to get out of working order.

Figure 1:
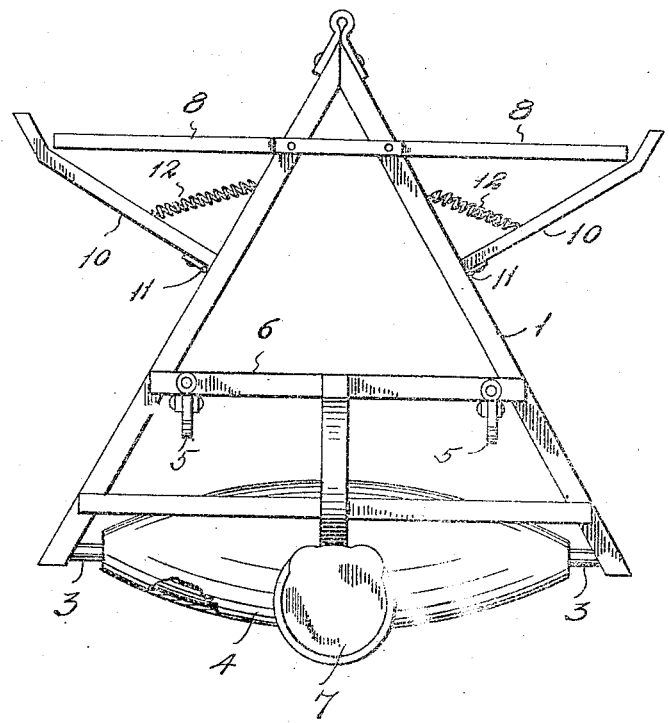
Figure 2:
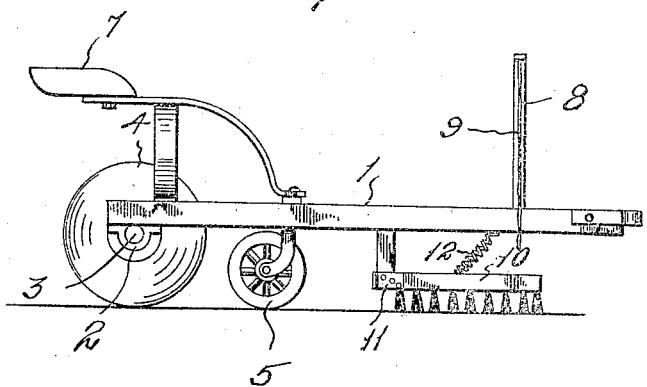

With the above and other objects in view, my invention has relation to certain novel features of construction and operation, an example of which is described in the following specification and illustrated in the accompanying drawings, wherein, Figure 1 is a plan view of the machine, and Fig. 2 is a side elevation.

In the drawings, the numeral 1 designates a triangular frame having at its rear ends bearings 2 receiving the axle 3 of an elliptical transverse roller 4. This roller is of greatest diameter at its center, so as to bear upon the ground at its central portion only. The frame is balanced upon roller wheels 5 supported in a cross-bar 6 which latter also supports a seat 7. Extending laterally from the opposite sides of the frame near its forward end, are upwardly bent brackets 8. These brackets support aprons 9 formed of cloth or other fabric, on each side of the frame.

As the machine is drawn through the field, the aprons or blankets being drawn over the stalks, brush the boll weevils and dead squares therefrom onto the ground below. The weevils and squares fall into the path of brushes 10 projecting outward and forward slightly in rear of the brackets. These brushes are supported below the frame and are hinged at 11 to swing rearward upon encountering obstructions, being returned to their normal position by coiled springs 12 extending therefrom to the frame. These brushes sweep the fallen squares and boll weevils toward the center of the machine and into the path of the central portion of the roller, which passes over them and crushes them, thus exterminating the boll weevils. Owing to the flexible mounting of the brushes 10 it will be obvious that they may swing or give in a rearward direction relative to the line of travel of the machine when engaged not only by unusual obstructions but also when coming in contact with the stalks so that the ground is brushed up to and around said stalks.

This machine will effectually exterminate the boll weevils and it is obvious that after being brushed from the bushes it is only a short time before the roller passes over the same and crushes them.

What I claim, is:

1. In a boll weevil exterminator, a frame, means for removing the boll weevils and dead squares from the stalks, means for brushing the said squares and boll weevils toward the center of the machine, and means carried by the frame for crushing said boll weevils and squares.

2. In a boll-weevil exterminator, a frame, means for dislodging the boll-weevils and dead squares from the stalks, means for gathering the same under the frame on the ground, and a revolving crushing device associated with the frame adapted to crush the boll weevils and dead squares on the ground.

3. In a boll weevil exterminator, a frame, aprons supported from the frame, brushes carried by the frame adapted to sweep fallen squares and weevils toward the center of the frame, and an elliptical roller on which the frame is mounted adapted to crush the said squares and weevils.

4. In a boll weevil exterminator, a frame, means carried by the frame for removing the boll weevils and dead squares from the stalks to the ground, means carried by the frame for crushing the boll weevils and dead squares on the ground and means for sweeping the boll weevils and dead squares inwardly toward said crushing means.

5. In a boll weevil exterminator, a frame, supports mounted on the frame, aprons carried by the supports, spring held brushes extending from the frame, supporting wheels beneath the frame, and a crushing ground roller carrying the frame at its rear end.

6. In a boll weevil exterminator, a carrier, means on the carrier for removing the boll weevils from the stalks, and a crusher on said carrier for exterminating said boll weevils comprising a roller widest at its center and tapering toward its opposite ends.

7. In a boll weevil exterminator, a carrier, means thereon for removing the boll weevils from the stalks and causing them to fall to the ground, flexibly mounted means on the carrier adapted to engage and brush around the base of the stalks and the ground adjoining the same to deflect the boll weevils to an exterminator on the carrier, in combination with said exterminator.

In testimony whereof I have signed my name to this specification in the presence of two subscribing witnesses.

JAMES W. EVANS.

Witnesses:
J. CLARENCE THOMAS,
W. D. ROBINSON.